Oct. 6, 1942.                     G. W. PIFER                     2,297,799
                                VIEWING DEVICE
                              Filed Sept. 6, 1940
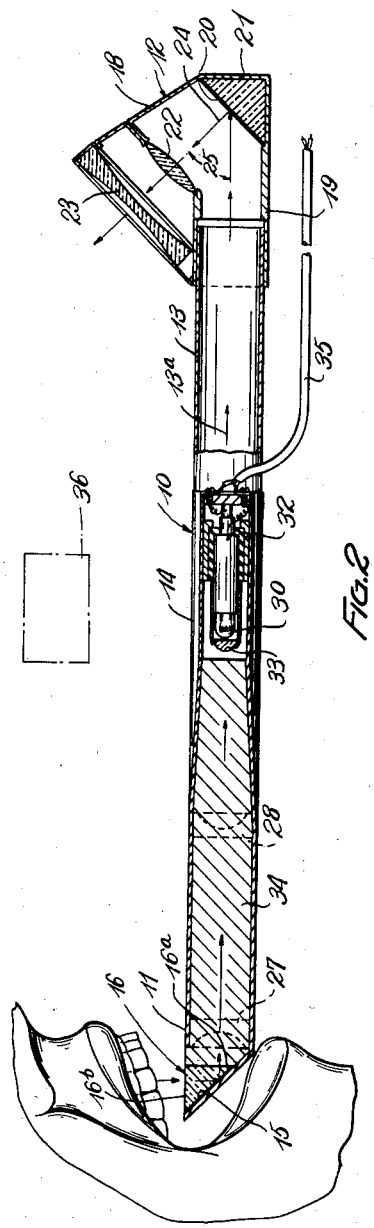
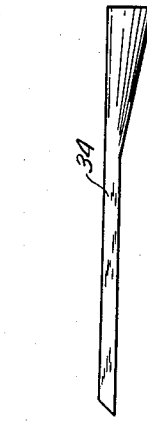
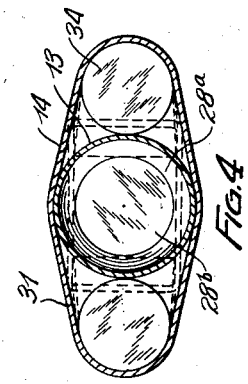
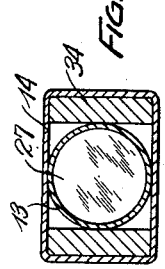
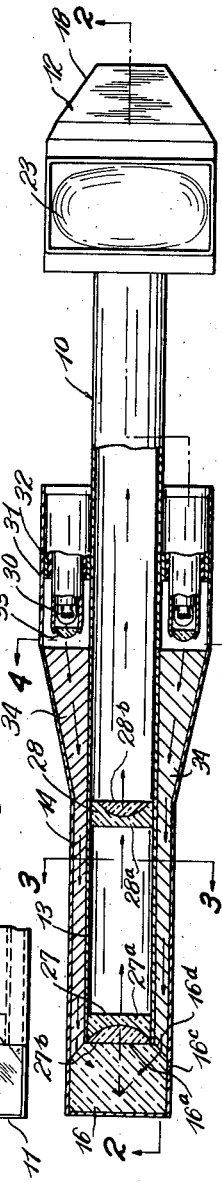
INVENTOR.
GEORGE W. PIFER
BY Kwis Hudson & Kent
ATTORNEYS Patented Oct. 6, 1942

2,297,799

UNITED STATES PATENT OFFICE 2,297,799

VIEWING DEVICE

George W. Pifer, Findlay, Ohio

Application September 6, 1940, Serial No. 355,643

2 Claims. (Cl. 128—11)

This invention relates to an instrument or device of the type adapted to be inserted into a body opening for viewing an inwardly disposed part or area and more particularly to an improved device of this character which is especially suitable for dental use.

Those skilled in the dental art are aware of the fact that a dentist's work in inspecting and caring for the teeth must be carried out with extreme care and accuracy and that this work is tedious and nerve straining because of the difficulty of performing such operations in the relatively small space afforded by the human mouth, and under the additional handicap of poor vision and a cramped or uncomfortable working position. It is frequently the case that if the dentist brings his head close enough to the patient's mouth to properly view the tooth or area being worked upon, the vision of one eye is more or less cut off by reason of the limited size of the mouth opening. Moreover, during much of the time the dentist is required to carry out his work while standing with his body in a cramped and tiring position. To alleviate as much as possible the strain of performing work of this character under the conditions indicated and to enable the dentist to perform his work with better vision and in a more comfortable position than heretofore, I have provided my improved viewing device to be hereinafter described.

It is therefore an object of this invention to provide an improved viewing device or instrument for dental and other uses by which a tooth or other portion of the human body to which only limited access can be had, can be viewed in an efficient manner during inspection or treatment thereof.

Another object of my invention is to provide an improved viewing device of the character mentioned having an objective end adapted to be inserted into the mouth or other body opening and an outer end provided with means for viewing and enlarging the image picked up by the objective end.

Still another object of my invention is to provide a viewing device of this character having a source of light thereon and also having solid light transmitting means for conducting light from such source to the objective end for illuminating the object or area being viewed.

A further object of my invention is to provide an improved device of this character for dental and other uses in which the viewing and enlarging means at the outer end of the device is so arranged that the dentist can observe the tooth or area upon which he is working without assuming a strained or unnatural position.

My invention may be further briefly summarized as consisting of certain novel combinations and arrangements of parts hereinafter described and particularly set out in the appended claims.

In the accompanying sheet of drawings, Fig. 1 is a plan view of a device or instrument constructed according to my invention, showing the same with the objective end thereof and the light source in section;

Fig. 2 is a view showing the device in longitudinal section as indicated by line 2—2 of Fig. 1, and also illustrating the manner of using the device.

Fig. 3 is a transverse sectional view taken on the line 3—3 of Fig. 1;

Fig. 4 is a transverse sectional view taken on the line 4—4 of Fig. 1;

Fig. 5 is an outside plan view of the objective end of the device; and

Fig. 6 is a plan view of one of the light transmitting members showing the same in detached relation.

More detailed reference will now be made to the accompanying drawing in which I have illustrated one embodiment of my viewing device or instrument, but it will be understood, of course, that the drawing is to be regarded as being mainly illustrative and that the invention may be embodied in various other similar devices and in various specific constructions for devices of this character.

In the embodiment of the invention illustrated in the drawing my viewing device is in the form of an elongated tubular structure 10 having an objective end 11, adapted to be introduced into the mouth or other body opening to pick up an image of the tooth or area to be viewed, and an outer end or section 12 having means for viewing and enlarging the image. As here shown, the device may include a tubular portion or barrel 13 and an outer casing or housing 14 surrounding a portion of such barrel and encasing other parts of the device. A reflecting surface 15 may be provided at the objective end 11 adjacent the end of the barrel 13 and arranged to extend in relatively inclined relation to the axis of the barrel, as shown in Fig. 2. This reflecting surface serves to pick up an image of a part or area lying at one side of the device and to direct or project such image longitudinally within the barrel 13 toward the enlarging and viewing section 12. The reflecting surface 15 may be obtained in various ways but is preferably formed by the diagonal face of a glass prism 16 located in the housing 14 at the inner end of the barrel 13. This diagonal face of the prism may be silvered or otherwise treated to improve the reflecting characteristics thereof. The prism 16 may be arranged with one side face 16a thereof extending transversely of and at right angles to the longitudinal axis 13a of the barrel and with its other side face 16b exposed to form a window to be presented to the part or area to be viewed.

The viewing and enlarging section 12 provided on head at the outer end of the device may comprise a hollow bowl-like structure or member 18 having a tubular portion 19 by which this structure may be mounted on or connected with the outer end of the barrel 13. This viewing and enlarging section may be provided with a relatively inclined reflecting surface 20 arranged to receive the image which is transmitted through the barrel 13 from the objective end by the reflecting surface 15. The reflecting surface 20 may be formed in various ways, such as by the diagonal face of a glass prism 21, which is silvered or otherwise treated to improve the reflecting qualities thereof.

The enlarging means provided at the viewing end 12 of the device may comprise a pair of lenses 22 and 23 mounted in the structure 18 in front of or above the reflecting surface 20. The lens 22 may be a double convex lens and the lens 23 may be a double concave lens. The purpose of these lenses is to enlarge the image which is transmitted to the reflecting surface 20 and they are so formed and arranged that a clear and distinct image will be seen even though the line of vision through the outer lens 23 may be to one side or the other of the center line or axis 24.

I have already stated above in a general way that a dentist is frequently required to assume strained and uncomfortable positions while performing work in the patient's mouth and that the use of my improved viewing device will enable the dentist to stand in a more normal and upright position while performing this work. When my viewing device is intended for dental use, best results are obtainable when the lenses 22 and 23 are arranged so that the angle 25 formed by the center line 24 and the longitudinal center line or axis line 13a of the barrel 13 is an acute angle, as illustrated in Fig. 2. With the arrangement just described it will be seen that when the objective end 11 is inserted into the patient's mouth, as shown in Fig. 2, the outer lens 23 will be so located that the dentist will be able to view the image on the reflecting surface 20 in a direct manner and while standing in a more normal and comfortable position.

It should be explained at this point that the viewing section 12 at the outer end of the device and the barrel 13 are relatively rotatable so that even though the barrel may be rotated through ninety degrees or one hundred and eighty degrees from the position shown in Fig. 2 to pick up images from the sides of the teeth or from the lower teeth, the enlarging and viewing section 12 can be maintained at or adjusted to a setting which will afford the maximum convenience for the dentist. Such relative rotation between the section 12 and the barrel 13 may be obtained by having the tubular portion 19 arranged to telescope over and swivel on the outer end of the barrel.

To obtain best results it may be desirable to provide one or more lenses in the barrel 13 for transmitting the image from the reflecting surface 15 to the reflecting surface 20. In this instance I show two such lenses 27 and 28, both of which may be compound lenses. The lens 27 may comprise a plano-concave section 27a and a plano-convex section 27b, and likewise the lens 28 may comprise a plano-concave section 28a and a plano-convex section 28b.

Although it may be possible to use the device without such lenses in the barrel 13, I find it is desirable to provide them for paralleling the rays of light which travels through the barrel in transmitting the image from the reflecting surface 15 to the reflecting surface 20. The lenses 27 and 28 may be suitably mounted in the barrel 13 and, as shown in Fig. 1, the lens 27 may be arranged in contact with the side face 16a of the prism 16.

For illuminating the part or area to be viewed and thereby improving the efficiency and usefulness of the device, I may provide the device with a light source and with a light transmitting means by which light can be delivered through the objective end to illuminate such part or area. The light source may comprise one or more electric lamps 30, in this instance two such lamps, contained in a lamp housing formed by an enlarged portion 31 of the outer housing 14. The lamps 30 may be small incandescent lamps mounted in suitable sockets 32 carried by the housing portion 31 and arranged on opposite sides of the barrel 13. If desired each of the lamps 30 may be provided with a suitable lens 33 located in front thereof.

Light from the lamps 30 may be transmitted or conducted to the objective end of the device through elongated members or bodies 34 of solid light-transmitting material which may be arranged on opposite sides of the barrel 13 to extend between the lamp housing 31 and the prism 16. As shown in the drawing the members 34 are located to lie against the wall of the barrel 13 and are of relatively reduced thickness for a substantial portion of their length adjacent the objective end and so as to render the cross-sectional area or transverse dimension of this portion of the device as small as possible. The members 34 may be molded or otherwise formed from a solid material of the kind which possesses the property of conducting light therethrough along either curved or straight lines. In some forms of my device the members 34 may be omitted and the light transmitted through the corresponding spaces or passages.

As shown in Figs. 1 and 5 the prism 16 may be made somewhat wider than the diameter or transverse dimension of the barrel 13 so that side portions 16c of the prism project laterally beyond the edges of the barrel. These projecting side portions of the prism may have relatively inclined faces 16d against which cordespondingly inclined end faces of the light transmitting members 34 seat or engage. These light transmitting members may be of any desired shape but, as here shown, they are of rectangular cross-section adjacent the prism 16 as seen in Fig. 3, and are round in cross-section adjacent the lamps 30 as shown in Fig. 4. The round portions of these members may be made tapered or otherwise shaped to merge into the above mentioned rectangular portions extending to the prism 16.

With the arrangement just described it will be seen that light from the lamps 30 will be conducted to the prism 16 through the solid members or bodies 34, and since these bodies lie wholly outside the barrel 13 none of the light will leak into the barrel and interfere with the image being transmitted from the prism 16 to the reflecting surface 20. The light conducted to the prism 16 through the solid members 34 enters the prism through the faces 16d thereof and is diffused and reflected by the prism and the reflecting surface 15 thereof and is thereby supplied to the portion or area which is to be viewed and adjacent which the exposed face or window 16b of the prism has been brought. When the part or area to be viewed has been thus illuminated a clear sharp image thereof will be reflected by the surface 15 of the prism 16 and transmitted through the lenses 27 and 28 to the reflecting surface 20 at the outer end of the device, where it can be conveniently observed or studied through the enlarging lenses 22 and 23.

Current may be supplied to the lamps 30 as by means of a flexible conductor cord 35 or, if desired, the conductor cord can be omitted and current may be supplied to the lamps through space by the use of suitable high frequency generating apparatus 36 located adjacent the dentist's chair or other place where the viewing device is to be used.

From the foregoing description and the accompanying drawing it will now be readily understood that I have provided an improved viewing device or instrument which may be applied to various uses, but which is especially applicable to dental work. It will be seen furthermore that the embodiment herein disclosed has an objective end of relatively small cross-sectional size which can be conveniently inserted into the mouth of a patient and that an image of the tooth or area to be studied or treated can be conveniently viewed by the dentist at the outer end of the device while he stands in a more or less natural and comfortable position. It will also be seen that the light source and light conducting means embodied in the device will cause diffused light to be supplied to the tooth or area to be observed, so that a clear and distinct image will be made to appear at the outer end of the device. It will be seen furthermore that my viewing device is of a simple construction and of small and compact form such that it can be conveniently held by the dentist in one hand while the other hand remains free to handle other instruments. The image appearing at the outer end of the device is not only clear and distinct, as above mentioned, but the field is enlarged and this enables the dentist to perform his work more thoroughly and accurately than has heretofore been possible.

While I have illustrated and described the improved viewing device of my invention in a more or less detailed manner, it will be understood, of course, that I do not wish to be limited to the particular device and form of construction herein disclosed but regard my invention as including all changes and modifications thereof coming within the scope of the appended claims.

Having thus described my invention I claim:

1. In a viewing device for dental use and the like, a barrel having an objective end carrying a prism and adapted to be inserted into the mouth, said prism being arranged to pick up an image and reflect the same longitudinally within said barrel and having portions projecting beyond the sides of the barrel, means at the outer end of said barrel for viewing and enlarging said image, sources of light located externally of said barrel and on opposite sides thereof outward of said prism a distance such that the light source will always be outside of the mouth while the device is in use, and solid light-transmitting members externally of the barrel and extending longitudinally on opposite sides thereof between said light sources and said projecting portions of the prism, said light-transmitting members lying against the wall of the barrel and being of reduced thickness for a substantial portion of their length adjacent said objective end.

2. In a viewing device for dental use, means providing an opaque barrel element having an objective end adapted to be inserted into a patient's mouth, a prism at said objective end arranged to pick up an image and reflect the same longitudinally within said barrel element, a viewing head at the outer end of the barrel element and rotatable relative thereto including a hollow portion arranged so that its central axis forms an acute angle with the central axis of said barrel element, a reflecting surface in said viewing head and arranged to receive the image from said prism, enlarging means carried by the hollow portion of said head and arranged for viewing the image on said reflecting surface, said prism having a portion projecting laterally beyond said barrel element, a source of light comprising an electric lamp mounted on the device outside of said barrel element and at a distance from said objective end such that the lamp will always be outside of the patient's mouth while the device is in use, and solid light-transmitting medium lying outside of said barrel element and extending therealong, said solid medium having one end thereof adjacent said lamp and its other end in engagement with the laterally projecting portion of said prism.

GEORGE W. PIFER.